(12) United States Patent
O'Connor

(10) Patent No.: US 8,485,221 B2
(45) Date of Patent: Jul. 16, 2013

(54) FLUSH VALVE HANDLE AND CHECK VALVE ASSEMBLY

(75) Inventor: J. Timothy O'Connor, Whispering Pines, NC (US)

(73) Assignee: Zurn Industries, LLC, Erie, PA (US)

( * ) Notice: Subject to any disclaimer, the term of this patent is extended or adjusted under 35 U.S.C. 154(b) by 1238 days.

(21) Appl. No.: 12/233,941

(22) Filed: Sep. 19, 2008

(65) Prior Publication Data

US 2009/0072177 A1 Mar. 19, 2009

Related U.S. Application Data

(60) Provisional application No. 60/994,413, filed on Sep. 19, 2007.

(51) Int. Cl.
*F16K 21/04* (2006.01)

(52) U.S. Cl.
USPC ............. 137/543.15; 251/356; 277/652

(58) Field of Classification Search
USPC ............. 137/543.15, 538; 251/38, 40, 333, 251/334, 82, 83, 356, 358, 368; 285/921; 277/440–442, 502, 652, 654
See application file for complete search history.

(56) References Cited

U.S. PATENT DOCUMENTS

| 1,266,340 | A | * | 5/1918 | Stewart | 251/358 |
|---|---|---|---|---|---|
| 1,494,706 | A | * | 5/1924 | Polleys | 12/126 |
| 1,878,001 | A | | 9/1932 | Sloan | |
| 2,755,816 | A | * | 7/1956 | Collins | 137/496 |
| 2,840,339 | A | * | 6/1958 | Price | 251/331 |
| 3,207,467 | A | | 9/1965 | Buhler | |
| 3,556,137 | A | * | 1/1971 | Billeter et al. | 251/40 |
| 4,134,570 | A | | 1/1979 | Walker | |
| 4,266,814 | A | * | 5/1981 | Gallagher | 285/921 |
| 4,535,808 | A | * | 8/1985 | Johanson et al. | 251/368 |
| 4,655,248 | A | * | 4/1987 | Chalaire | 137/528 |
| 4,883,254 | A | | 11/1989 | Whiteside | |
| 5,044,604 | A | * | 9/1991 | Topham et al. | 251/368 |
| 5,183,075 | A | * | 2/1993 | Stein | 251/368 |
| 5,497,802 | A | | 3/1996 | Whiteside | |
| 5,505,427 | A | | 4/1996 | Whiteside | |
| 6,019,343 | A | | 2/2000 | Tsai | |
| 6,056,270 | A | * | 5/2000 | Zimmerly | 251/368 |

(Continued)

OTHER PUBLICATIONS www.zurn.com/operations/aquaflushsense/pdfs/installation/FV211.pdf; product sheets for Zurn AquaVantage Repair Kits (5 pgs.), published Aug. 2001.

*Primary Examiner* — Craig Schneider
*Assistant Examiner* — Craig J Price
(74) *Attorney, Agent, or Firm* — The Webb Law Firm

(57) ABSTRACT

A flush valve handle assembly and a check valve assembly are provided for use in a flush valve, wherein the flush valve handle assembly and check valve assembly include improved components. The flush valve handle assembly includes a ball member and a plunger rod, one or both of which can be constructed of a polymeric material. An improved flush file retainer is provided which includes at least one ear integrally formed around a circumferential portion thereof. This at least one ear secures the flush file retainer in a snap-fit configuration in the socket-coupling. The check valve assembly includes a piston/seal having a plurality of ribs having a tapered design extending outwardly from a circumferential periphery of the piston/seal. The piston/seal includes a sealing material located on a top surface thereof. This sealing material can be a thermoplastic elastomeric coating material.

2 Claims, 17 Drawing Sheets

U.S. PATENT DOCUMENTS

| | | |
|---|---|---|
| 6,227,219 B1 | 5/2001 | Pino |
| 6,299,128 B1 | 10/2001 | Verdecchia |
| 6,454,243 B2 * | 9/2002 | Kawolics et al. ............. 251/262 |
| 6,913,239 B2 * | 7/2005 | Nortier ........................... 251/40 |
| 7,891,528 B2 * | 2/2011 | Costa et al. ................... 277/440 |
| 2003/0001123 A1 | 1/2003 | Nortier |
| 2005/0087710 A1 * | 4/2005 | Nortier ........................... 251/40 |

* cited by examiner

FLUSH VALVE HANDLE AND CHECK VALVE ASSEMBLY

CROSS REFERENCE TO RELATED APPLICATIONS

This application is based on Provisional Patent Application No. 60/994,413, filed Sep. 19, 2007, entitled "Flush Valve Handle and Check Valve Assembly", on which priority of this patent application is based, and which is hereby incorporated by reference in its entirety.

BACKGROUND OF THE INVENTION

1. Field of the Invention

The present invention relates generally to a flush valve assembly and a check valve assembly and, more particularly to improved components, such as the ball member, plunger and retainer for use with a flush valve assembly, and the seal piston for use with the check valve assembly.

2. Description of Related Art

As is known in the art, flush valve handles include ball members are usually of unitary steel construction with the handle of the flush valve assembly. For example, such ball members are disclosed in U.S. Pat. Nos. 4,883,254; 6,227,219 and 5,505,427; and United States Patent Application Publication No. US 2003/0001123.

U.S. Pat. Nos. 6,299,128; 6,019,343; 4,134,570; 3,207,467 and 1,878,001 disclose various handle seal arrangements currently in use.

It is a continuing objective in the field of flush valve technology to improve upon components thereof. Improvements to such components would increase operating life cycles, decrease failure rates, reduce manufacturing costs, improve sealing efficiency, increase efficiency of assembly and/or installation and improve consistency between flushes and other values. It is also an object of the present invention to provide a smoother handle operation.

More specifically, the present invention, as shown in FIG. 1, is directed to a flush valve arrangement, generally indicated as 1, that includes a flush valve assembly 10 in fluid communication upstream to a control stop or flush valve check assembly 40.

As described in U.S. Pat. No. 6,299,128, which is hereby incorporated by reference and referring to FIG. 2A, flush valves in water closets, urinals and other plumbing devices which utilize a flexible diaphragm to establish and to seal off the connection between the inlet and outlet are well-known in the art. FIG. 2A illustrates a typical prior art flush valve and diaphragm assembly generally illustrated as 10'. The flush valve and diaphragm assembly 10' has a hollow body 11', generally made of brass, which includes an inlet connection 12', an outlet connection 14' and a handle connection 16'. A barrel 18' is positioned within the flush valve such that the connection between the inlet 12' and the outlet 14' is through the barrel 18'. An annular main valve seat 20' is formed on a first or top end 21' of the barrel 18'. The annular main valve seat 20' is normally closed by a diaphragm 22' extending across the body 11' and defining an upper chamber 24'. The diaphragm 22' has a bypass 26' which provides fluid communication between the inlet side of the flush valve and the upper chamber 24'. The diaphragm 22' is attached at its outer edge to the valve body and is clamped in place by an annular clamping rim on an outer cover 13' of the body 11'. The diaphragm 22' has an opening which allows for fluid communication between the upper chamber 24' and the outlet connection 14'. A relief valve 28' normally closes the opening at the center of the diaphragm 22'.

The operation of the flush valve and diaphragm assembly 10' is generally as follows. In the normally closed position shown in FIG. 2A, water pressure at the valve inlet is communicated to the upper chamber 24' through the bypass 26'. Since the surface area which is subjected to water pressure is greater on the upper side of the diaphragm 22', the water pressure forces the diaphragm 22' down onto the main valve seat 20' preventing water from flowing to the outlet connection 14'. When the user moves a handle 30' in any direction, a plunger 32' moves inwardly tilting a stem 34' of the relief valve 28'. This releases the pressure in upper chamber 24' by allowing water to flow through a guide member 36'. With the upper chamber pressure relieved, the inlet water pressure forces the diaphragm 22' upwardly, off the main valve seat 20' allowing water to flow directly from the inlet connection 12' through the barrel 18' to the outlet connection 14'. When the diaphragm 22' and the relief valve 28' move upwardly, the relief valve 28' resets itself, closing off the upper chamber 24'. Water will then flow through the bypass 26' into the upper chamber 24' until the diaphragm 22' is again forced against the main valve seat 20', thereby closing the valve. The guide member 36' moves with the diaphragm 22' and includes outwardly extending radial wing members 38' which engage the inner surface of the barrel 18' to guide the guide member 36' and the attached diaphragm 22' as the diaphragm 22' moves up and down. The diaphragm 22' defines a central passageway 39' (i.e., hole). The bypass 26' is radially spaced from the central passageway 39'.

Flush valves currently in use typically employ brass or other materials to form the ball member and/or plunger. These materials continue to become more expensive to obtain which translates into more expensive manufacturing costs for the production of the ball member and/or plunger. Additionally, it is desirable to reduce tooling costs whenever possible and to eliminate the number of individual working parts in the flush valve. Additionally, the flush file retainers currently in use can be difficult to center in the valve with respect to the socket coupling. Another disadvantage of the currently used flush file retainers is that a separate washer must be provided to seal the retainer against the handle seal. Additionally, upon replacement or repair of this component, care must be taken to assure that it will be trapped against the valve, otherwise inconsistent flushing can occur. Accordingly, there is a need in the art for a flush file retainer design that can be readily centered in the valve, ensures consistent flushing of the flush valve, and adequately seals the retainer against the handle, while reducing the number of assembly components.

Flush valve arrangements 1, as discussed above typically include a check valve 40', as illustrated in FIG. 2B, to control the amount of water relayed from the water source to the flush valve 10'. The check valve 40' includes a threaded inlet 41' connected to a water supply and a threaded outlet 42' associated with the inlet connection 12' of the flush valve assembly 10'. A valve seat 43' is formed adjacent the inlet 41' and a piston/seal 44' is movable to close upon the valve seat 43', thus shutting off the flow of water between the inlet 41' and outlet 42'. Generally, water is able to enter the check valve 40' from the source through the inlet 41' and apply a force to the piston/seal 44' in a first direction. A spring 45' is provided to push the piston/seal 44' in an opposition direction to maintain the piston/seal 44' in a biased closed position. Once enough water pressure has built-up against the piston/seal 44', the counter forces exerted by the spring 45' are insufficient to maintain the seal against the opening 46' of inlet 41'. Therefore, water begins to flow over and past the piston/seal 44' towards the flush valve assembly 10'. During use of these piston/seal arrangements 44', the seal can become degraded and leaks can occur between the seal 47' and valve seat 43'. Additionally, difficulties may arise in the movement of the water past the piston/seal arrangement 44' toward the flush valve assembly 10'. There is a need in the art for a piston/seal arrangement 44' that can overcome these disadvantages of the prior art.

SUMMARY OF THE INVENTION

According to a first aspect, the invention is directed to a flush valve handle assembly for use in a flush valve, wherein the flush valve handle assembly comprises a ball member constructed of a polymeric material. This polymeric material can include a thermoplastic elastomer, such as acetal. The flush valve handle assembly can further include a handle and a plunger rod associated with the ball member wherein the handle and the plunger rod are also formed from a polymeric material. According to one embodiment, this handle can be integrally formed with the ball member.

According to a second aspect, the invention is directed to a flush file retainer adapted to be received in a socket-coupling of a flush valve handle assembly. The flush file retainer includes at least one ear integrally formed around a circumferential portion thereof. This at least one ear is adapted to secure the flush file retainer in a snap-fit configuration in the socket-coupling. The circumferential lip can include an integral sealing bead extending along a circumferential portion thereof for forming a seal between the flush file retainer and the flush valve. According to one embodiment, the flush file retainer comprises a cup-shaped member which fits loosely within a socket-coupling resulting in consistent flushing of the flush valve.

According to a third aspect, the invention is directed to a piston/seal for use with a flush valve check valve assembly, wherein the piston/seal includes a plurality of ribs having a tapered design extending outwardly from a circumferential periphery of the piston/seal. The piston/seal includes a sealing material located on a top surface thereof. This sealing material can be a thermoplastic elastomeric coating material. According to one embodiment, the piston/seal can be a unitary molded polymeric piece. A plurality of passageways are defined between the plurality of tapered ribs and a cylindrical sidewall portion of the piston/seal to facilitate the flow of water past the piston/seal. According to one design, the top surface of the piston/seal can include a gate passageway having a center portion and a plurality of outwardly extending spokes leading to a circular recess adjacent the circumferential edge of the top surface. In this design, the sealing material is positioned within the gate passageway of the top surface, including the circular recess, to form an annular seal extending above the top surface of a piston body. The annular seal is adapted to seal with a seat of a stop within the check valve assembly at a location adjacent to a water source inlet.

According to a fourth aspect, the invention is directed to a flush valve handle assembly adapted for initiating a flushing sequence within a flush valve. The flush valve handle assembly includes a handle having a connecting portion and is adapted for movement in at least one direction. The handle assembly further includes a ball member having a contact portion and is associated with the connecting portion of the handle, such that movement of the handle causes the ball member to pivot in at least one direction. The ball member includes a central bore extending therethough for receiving the connecting portion of the handle. The handle assembly also includes a plunger rod associated with the contact surface of the ball member. This plunger rod is adapted for movement upon pivoting movement of the ball member. A socket-coupling secures the handle to the flush valve. A flush file retainer, including a central aperture extending therethrough is provided for receiving the plunger rod. The flush file retainer includes an attachment member associated therewith adapted for a self-centering attachment of the flush file retainer with the socket-coupling and a spring is positioned between the ball member and the flush file retainer. The flush file retainer comprises a circumferential lip having a front surface facing the flush valve, a rear surface facing the ball member, and a circumferential portion extending from the rear surface of the circumferential lip. The attachment member comprises at least one ear extending from the circumferential portion. The at least one ear is adapted to snap within a recessed ring of the socket-coupling to form a snap-fit configuration with the socket-coupling.

According to a fifth aspect, the invention is directed to a flush valve comprising a valve body defining an inlet connection and an outlet connection and a diaphragm assembly positioned in the valve body and separating the inlet connection and the outlet connection. The diaphragm assembly is configured to have a pressure difference applied across the assembly and has a flexible diaphragm body having a first side and a second side and defines a bypass orifice extending from the first side to the second side. The flush valve further includes an elongated barrel member attached to the diaphragm, at least one of the diaphragm and barrel defining a central passageway, the bypass orifice radially spaced from the central passageway. A stem is associated with the diaphragm assembly and extends within at least a portion of the elongated barrel member. The flush valve handle assembly includes a plunger rod adapted for contacting the stem and initiating a flushing sequence. The flush valve handle includes a ball member formed from a polymeric material for sealing the flush handle to a first end of a socket-coupling and a flush file retainer adapted to form a snap-fit with a second end of the socket-coupling. A check valve assembly is associated with the inlet connection of the valve body. The check valve assembly includes a piston/seal having a top surface located adjacent to a water source inlet and a plurality of ribs having a tapered design extending from the top surface in an outwardly direction from a circumferential periphery thereof. This top surface includes a sealing material positioned thereon.

According to a sixth aspect, the invention is directed to a check valve comprising a valve body defining an inlet connection and an outlet connection. The inlet connection is adapted for association with a water supply or source. The outlet connection is adapted for association with an inlet connection of a flush valve. A piston/seal is located within the valve body. This piston/seal has a top surface which is adapted for biasing against a valve seat of the inlet connection for sealing the inlet and includes a sealing material positioned thereon. The piston/seal includes a plurality of ribs having a tapered design extending from the top surface in an outwardly direction from a circumferential periphery thereof for facilitating the flow of water from the water supply source past the piston/seal.

Further details and advantages will be understood from the following description of the preferred embodiments, taken with the accompanying drawings, wherein like reference numerals represent like elements throughout.

BRIEF DESCRIPTION OF THE INVENTION

Figure 1:
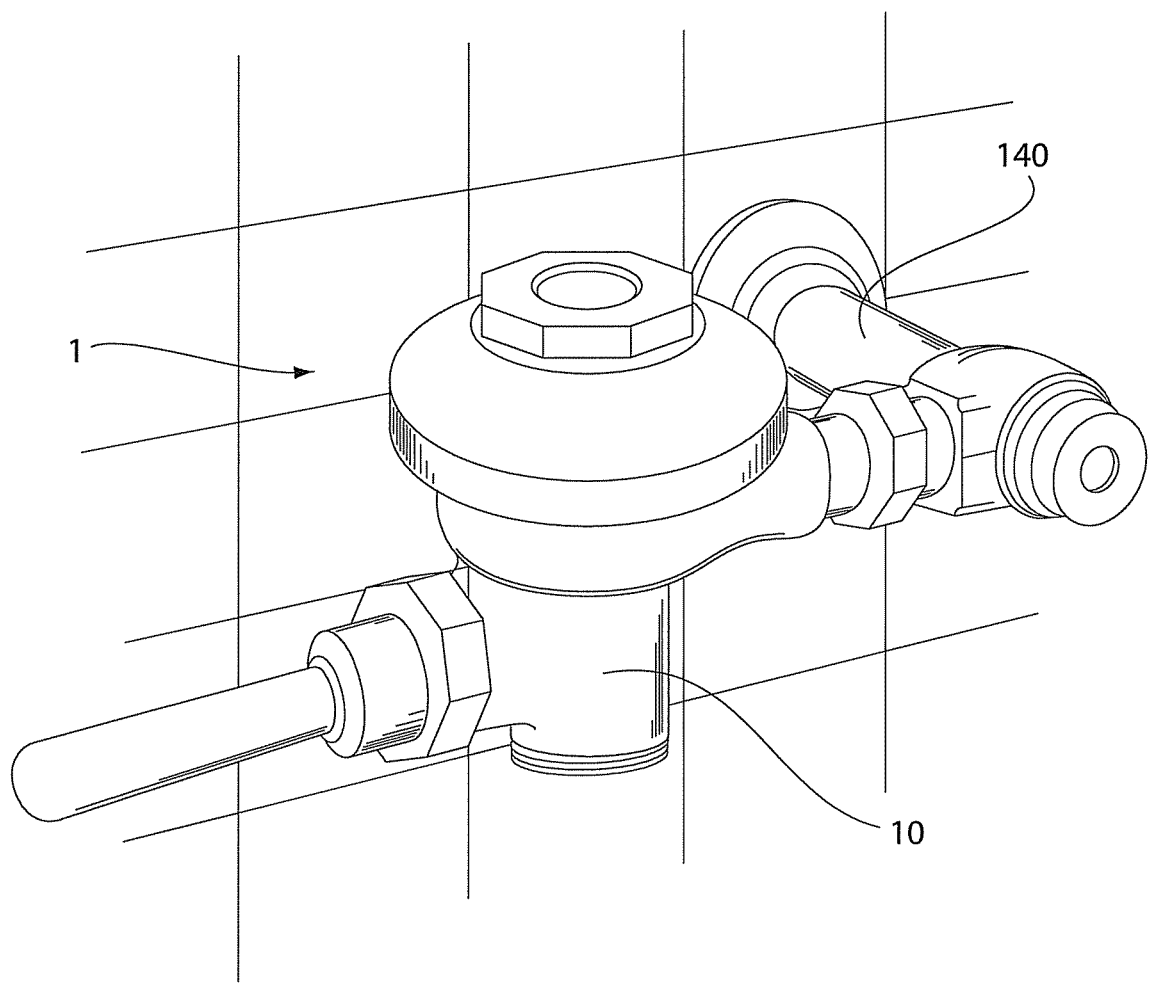
FIG. 1 is a top perspective view of a flush valve arrangement made in accordance with the present invention.

For purposes of the description hereinafter, spatial or directional terms shall relate to the invention as it is oriented in the drawing figures. However, it is to be understood that the invention may assume various alternative variations, except where expressly specified to the contrary. It is also to be understood that the specific components illustrated in the attached drawings, and described in the following specification, are simply exemplary embodiments of the invention. Hence, specific dimensions and other physical characteristics related to the embodiments disclosed herein are not to be considered as limiting.

The aforementioned improvements sought to overcome the deficiencies of prior art flush valve assemblies and check valve assemblies are embodied by the features of the components discussed herein.

Figure 3A:
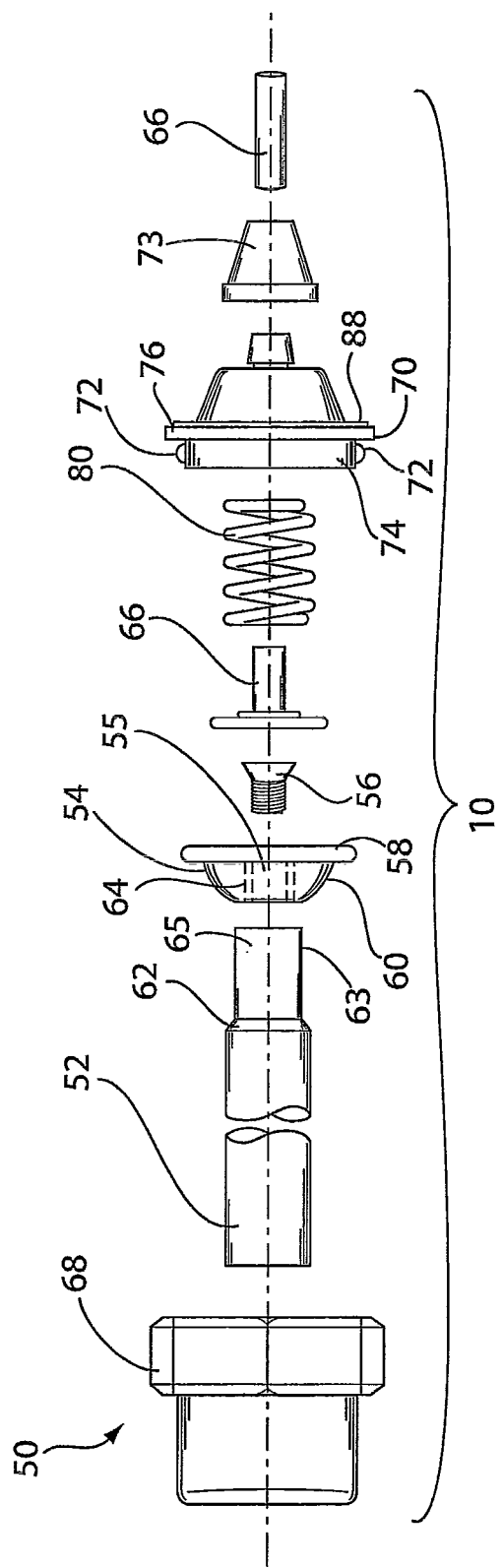
FIG. 3A is a side plan exploded view of a flush valve handle in accordance with the present invention.
Figure 3B:
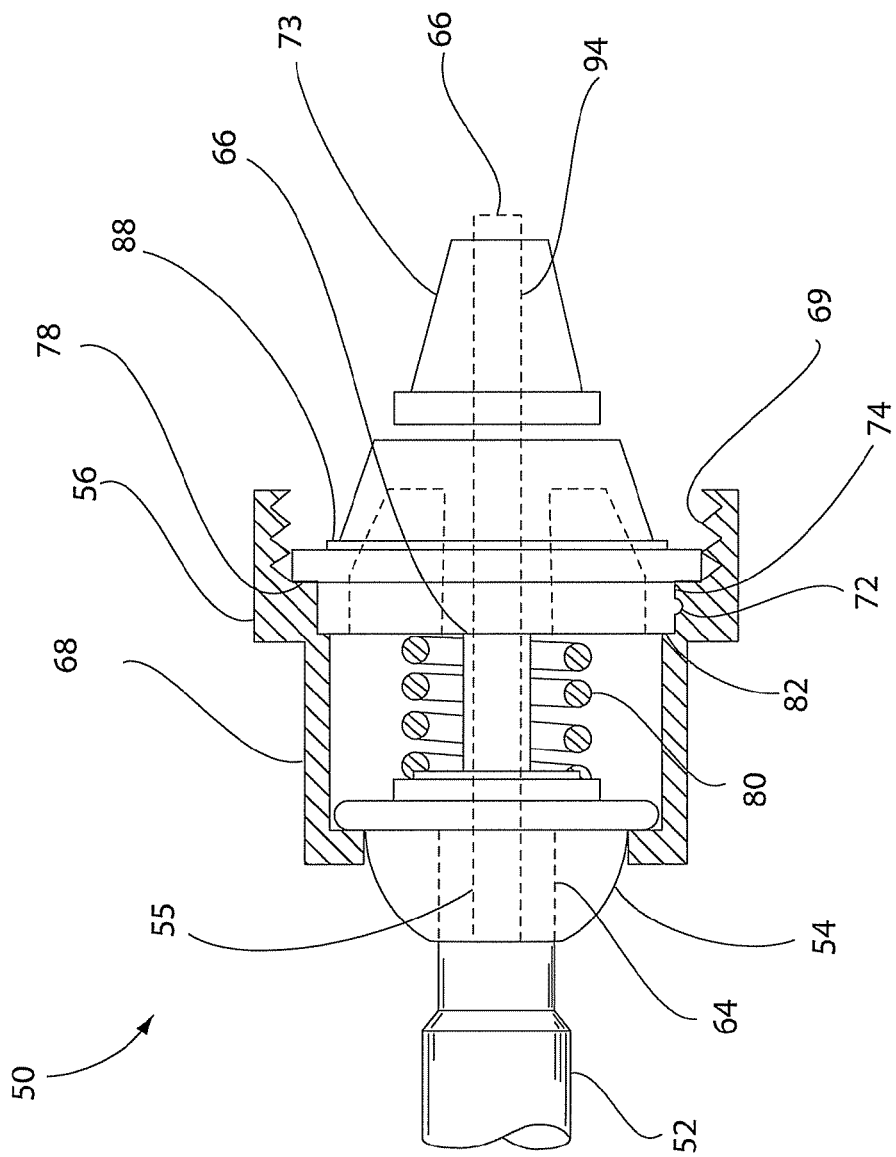
FIG. 3B is a side elevational view, partially in section, showing the flush valve handle assembly shown in FIG. 3A.
Figure 3C:
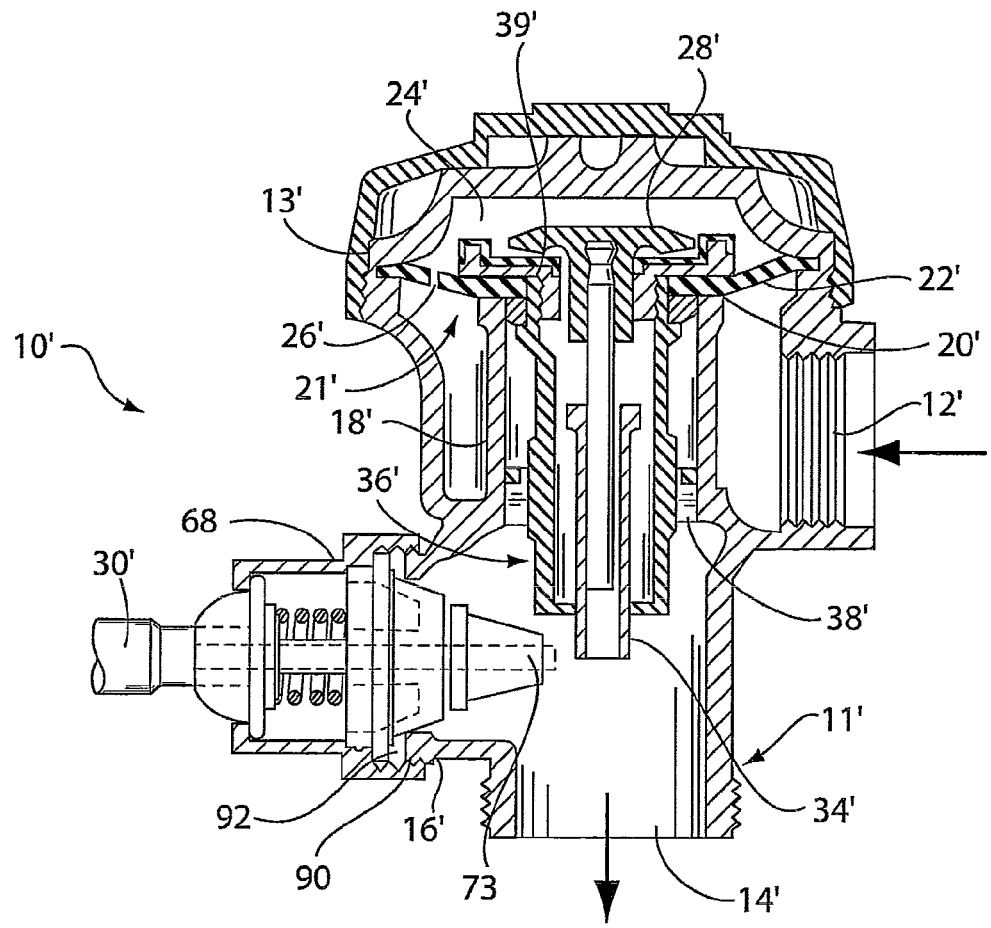
FIG. 3C is a side elevational view, partially in section, showing the flush valve handle assembly shown in FIGS. 3A and 3B, secured to a flush valve.
Figure 4A:
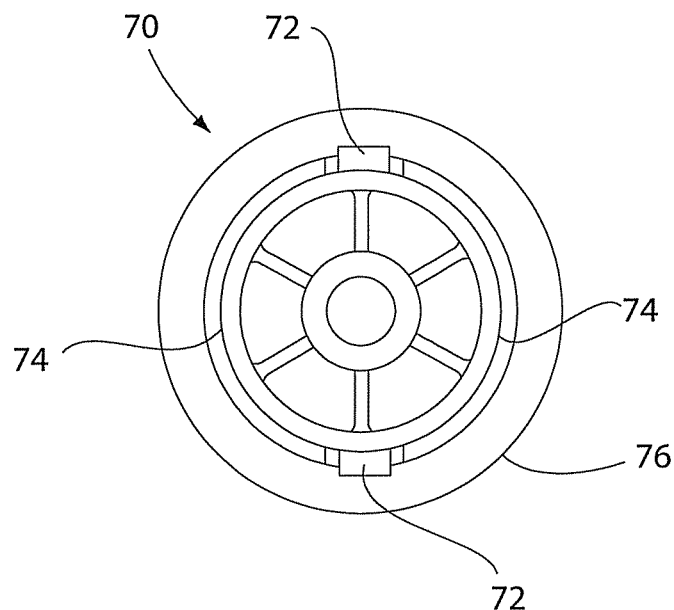
FIG. 4A is a bottom plan view of a flush valve retainer for securing the flush valve handle in accordance with the present invention, partially in section.
Figure 4B:
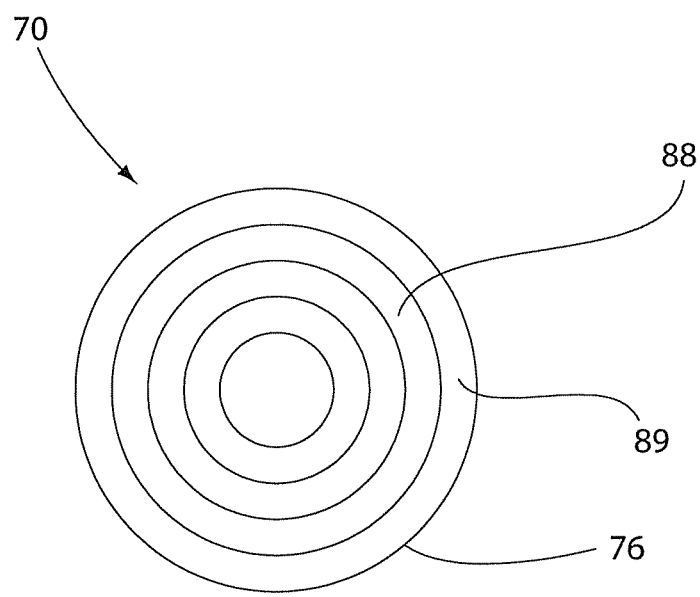
FIG. 4B is a top plan view of the flush valve retainer shown in FIG. 4A.
Figure 5:
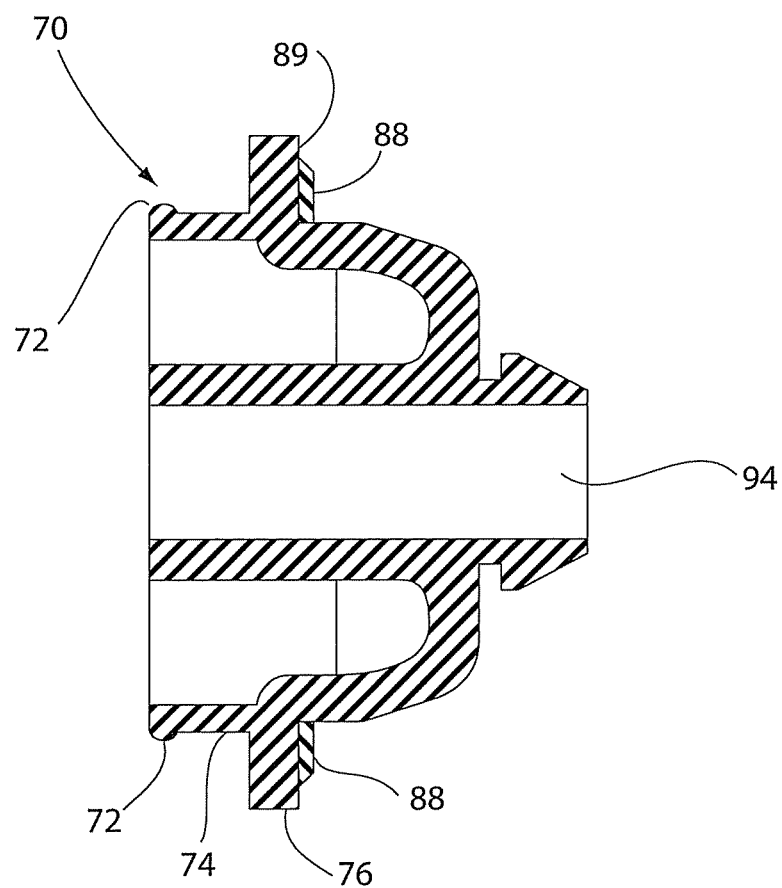
FIG. 5 is a side elevational view of the flush file retainer of FIG. 4A.

Reference is now made to FIGS. 3A-3C which depict a flush valve handle assembly of the present invention, generally indicated as 50, for use in a flush valve. The flush valve handle assembly 50 includes a handle 52. The handle 52 is movable in at least one direction and includes a connecting portion 63. According to one embodiment, the handle 52 is secured to a ball member 54 via a screw 56 or any other means of attachment. Alternatively, the ball member 54 may be integrally formed with the handle 52. The ball member 54 is constructed of a lightweight, durable, low wear and low friction type of polymeric or plastic material, such as acetal. According to one embodiment, the ball member 54 may be constructed from Delrin® or polyoxymethylene, an engineering plastic developed and owned by E.I. DuPont de Nemours and Company of Wilmington, Del. One example includes Delrin® 500, a medium viscosity resin for general purpose use. This polymeric or Delrin® ball member 54 would be used as a substitute or original OEM component in place of brass or other metallic ball members currently in use. As shown in FIGS. 3A and 3B, the ball member 54 includes a central bore 55 to accommodate the shaft of the screw 56 therethrough. The ball member 54 includes a contact surface 58 and frusto-conical surface 60. According to one embodiment, the ball member is associated with the connecting portion of the handle such that movement of the handle 52 causes the ball member 54 to pivot in at least one direction. According to another embodiment, the ball member 54 and the handle 52 are integrally formed with one another such that movement of the handle 52 in any direction causes the ball member 54 to pivot. The ball member 54 includes a central bore 64 extending therethough for receiving the connecting portion 63 of the handle 52. The handle 52 may be pushed or pulled to pivot the ball member 54. The connecting portion 63 of the handle 52 may include a threaded opening 65 for receiving the screw 56. The screw 56 may lay flush with a relatively flat contact surface of the interior portion of the ball member 54. It is to be understood that the ball member 54 may embody various dimensions and sizes to accommodate various handle designs. Furthermore, it is to be understood that the use of a polymeric material or Delrin® may be employed in the construction of the entire handle 52 such that the ball member 54 and the handle 52 would be constructed as a unitary piece.

Figure 2A:
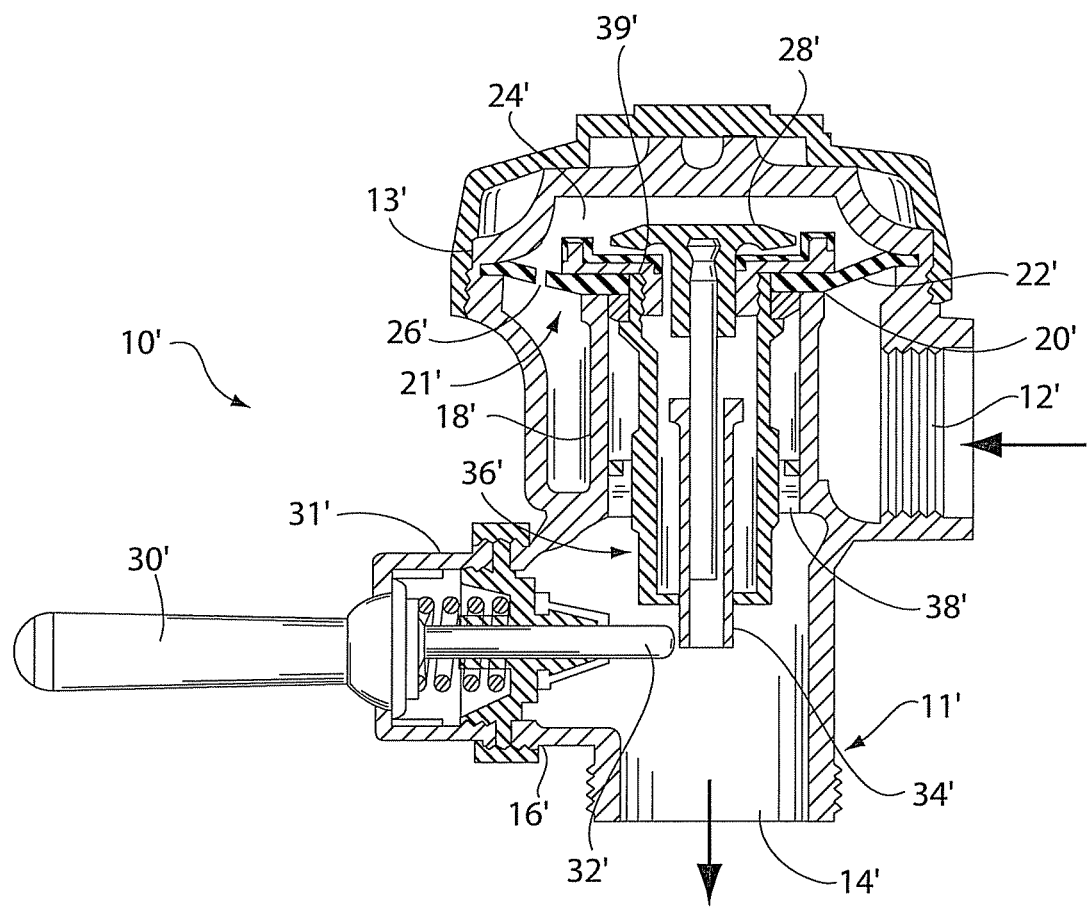
FIG. 2A is a side elevational view, partially in section, showing a prior art flush valve handle assembly.
Figure 2B:
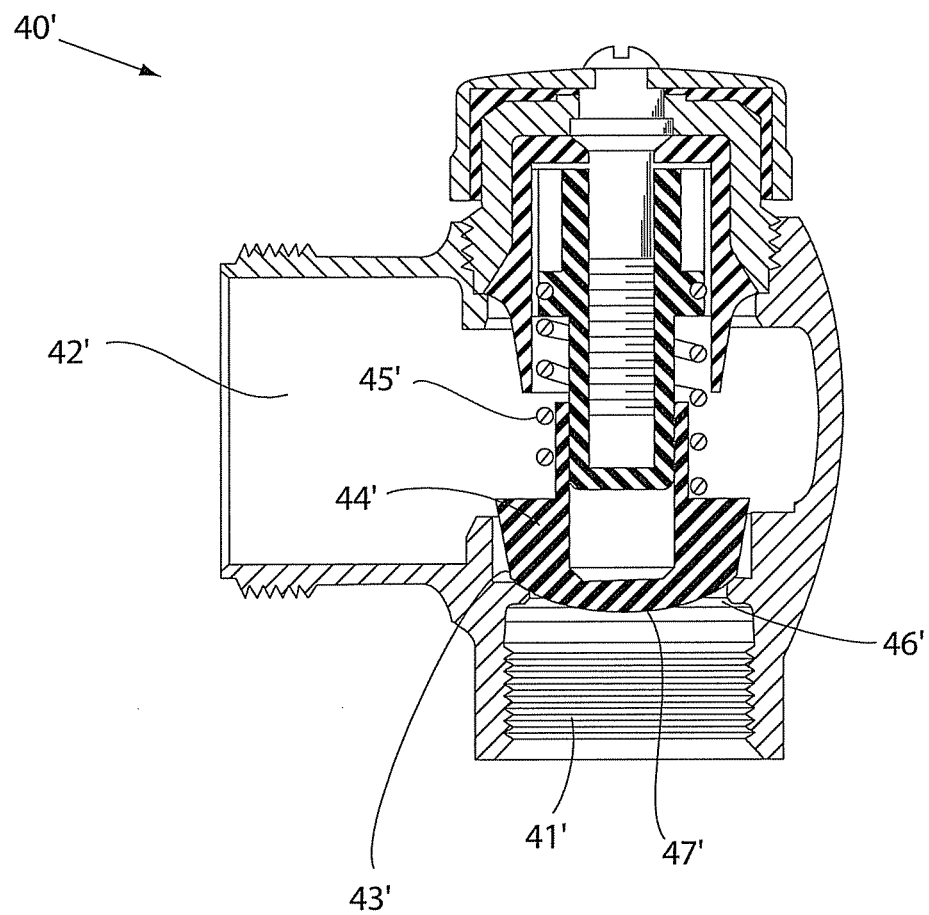
FIG. 2B is a side elevation view, partially in section, showing a prior art check valve handle assembly.

With continuing reference to FIGS. 3A-3C, a plunger rod 66 is associated with the contact surface 58 of the ball member 54. This plunger rod 66 is adapted for axial movement upon pivoting movement of the ball member 54 to initiate a flushing sequence of the flush valve. A socket-coupling 68 is provided for securing the handle 52 to the flush valve and diaphragm assembly 10 in a manner similar to that shown in FIG. 2A wherein a socket coupling 31' secures handle 30' to flush valve 10'.

With continuing reference to FIGS. 3A-3C, 4A, 4B and 5, a flush file retainer 70 and handle seal 73 are provided for securing the flush valve handle within the socket-coupling 68. According to one embodiment, the flush file retainer 70 comprises a cup-shaped member which fits loosely within the socket coupling 68 resulting in consistent flushing of the flush valve 10. According to one embodiment, this socket-coupling 68 includes an internally threaded portion 69. Preferably, the socket-coupling 68 is made of a metallic material. Specifically, the flush file retainer 70 comprises a circumferential lip 76 having a front surface 89 facing the flush valve 10 and a rear surface 91 facing the ball member 54. A circumferential portion 74 extends from the rear surface 91. An attachment member is associated with the circumferential portion 74, which is adapted for a self-centering attachment of the flush file retainer 70 with the socket-coupling 68. Preferably this attachment member comprises at least one extended tab or ear 72 integrated around the circumferential portion 74 of the flush file retainer. The circumferential lip 76 is adapted to be seated onto one side of an interior lip 78 of the socket-coupling 68. Desirably, the at least one ear 72 is of a unitary construction with respect to the flush file retainer 70 and is designed to have an inherent resilience allowing the at least one ear 72 to bend inward and outward independent of the circumferential portion 74. This allows the at a least one ear 72 to engage another side of the interior lip 78 of the socket-coupling 68 when pushed into the socket-coupling 68, thereby securing the flush file retainer 70 in the socket-coupling 68 in a snap-fit or locked-in configuration. Accordingly, in connection with a spring 80 positioned between the ball member 54 and the flush file retainer 70, the handle 52 is effectively secured within the socket-coupling 68.

The flush file retainer 70 may also include an integral seal bead 88 situated along a front surface 89 of circumferential lip 76. The integral seal bead 88 eliminates the need for a separate washer. As one side of the integral seal bead 88 is already joined to the flush file retainer 70, the integral seal bead 88 may function as a more effective seal against the threaded shaft 90 of the flush valve handle assembly 10 as shown in FIG. 3C to which the socket-coupling 68 is threadably secured. The bead 88 is specifically designed to abut against the flush valve body 10 at an annular portion 92 indicated in FIG. 3C. In operation, the bead 88 is compressed against the flush valve body at 92 forming a seal.

As with prior art flush file retainers, the flush file retainer 70 of the present invention includes a throughbore 94 for accommodating a plunger rod 66 therethrough. However, the plunger rod 66 of the present invention may be constructed of plastic made of acetal material, as opposed to metal. The snap-in retainer 70 fits loose to assure that it always is trapped against the flush valve 10, which allows a consistent actuator rod to trip relationship, thus delivering consistent flushes after assembly, repair, or re-assembly. The snap feature also allows for self centering. Specifically, as seen in FIGS. 3B and 3C, the ears 72 are received in a recessed ring 82 in the socket-coupling 68, thereby locking the snap-in retainer 70 in place.

Figure 6A:
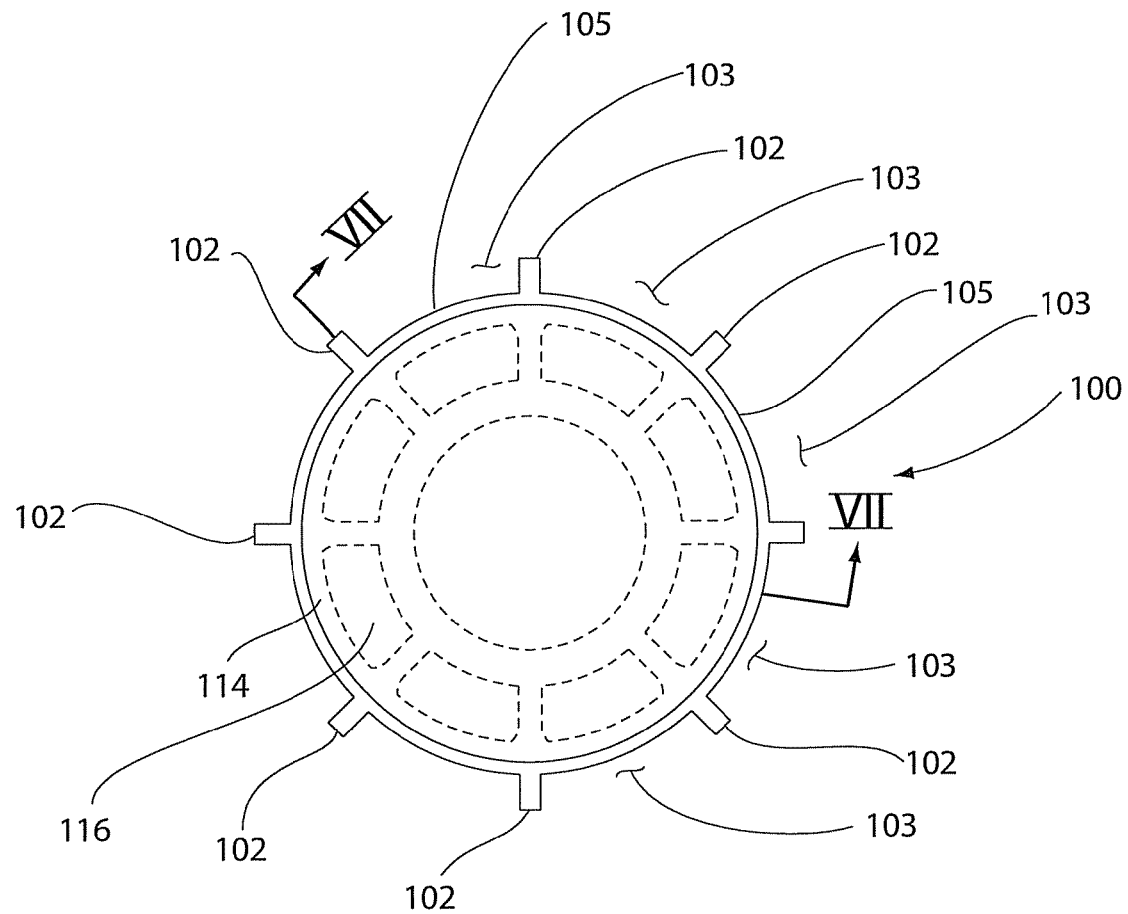
FIG. 6A is a top plan view of a piston/seal for use with a flush valve check valve in accordance with the present invention.
Figure 6C:
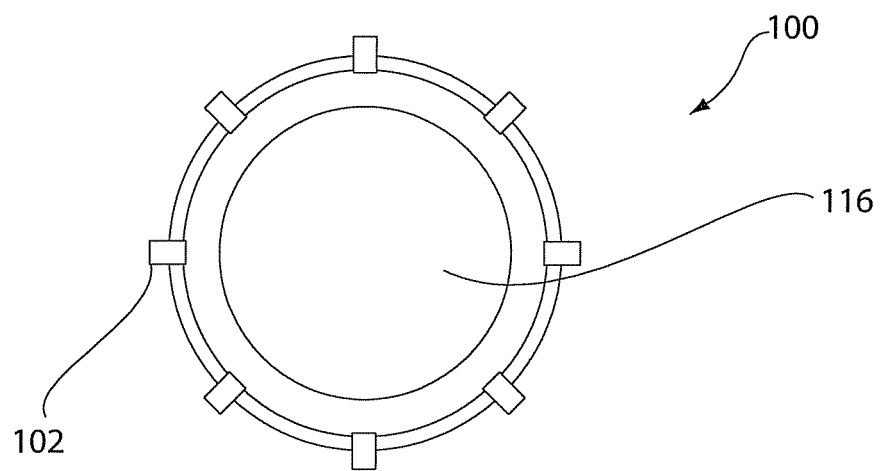
FIG. 6C is a top plan view of the piston/seal similar to FIG. 6A without hidden lines.
Figure 6B:
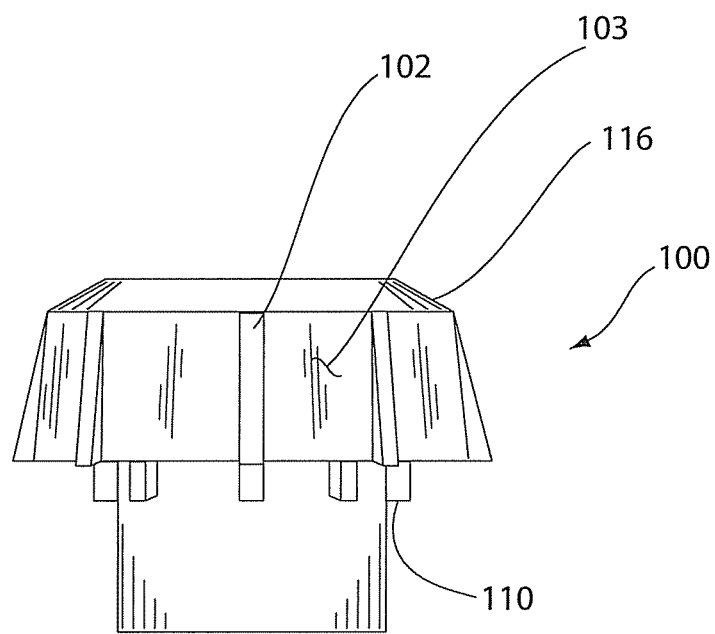
FIG. 6B is a side elevational view of the piston/seal shown in FIG. 6A.
Figure 7:
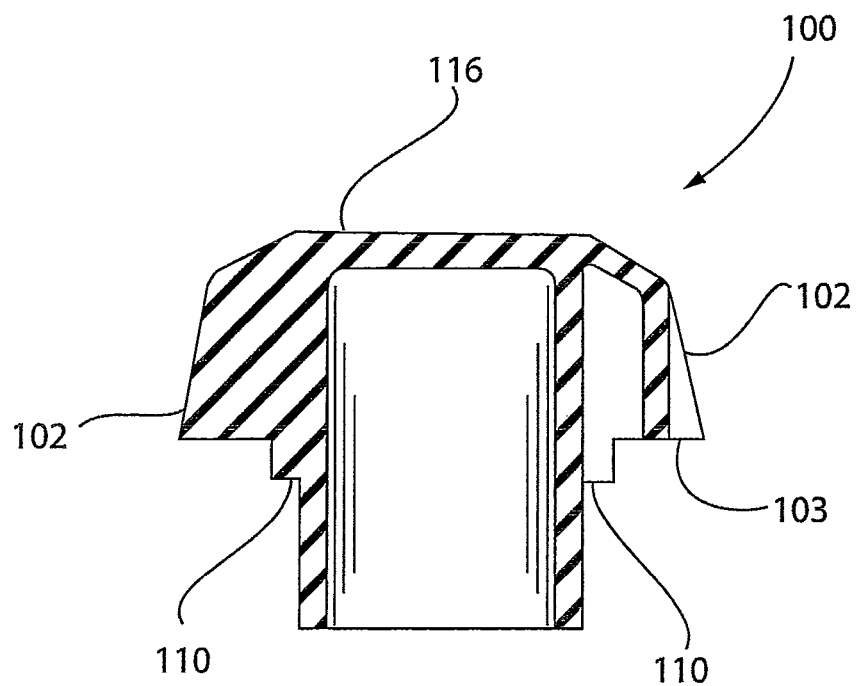
FIG. 7 is a side elevational view, in section, taken along line VII-VII of the piston/seal of FIG. 6A.
Figure 8:
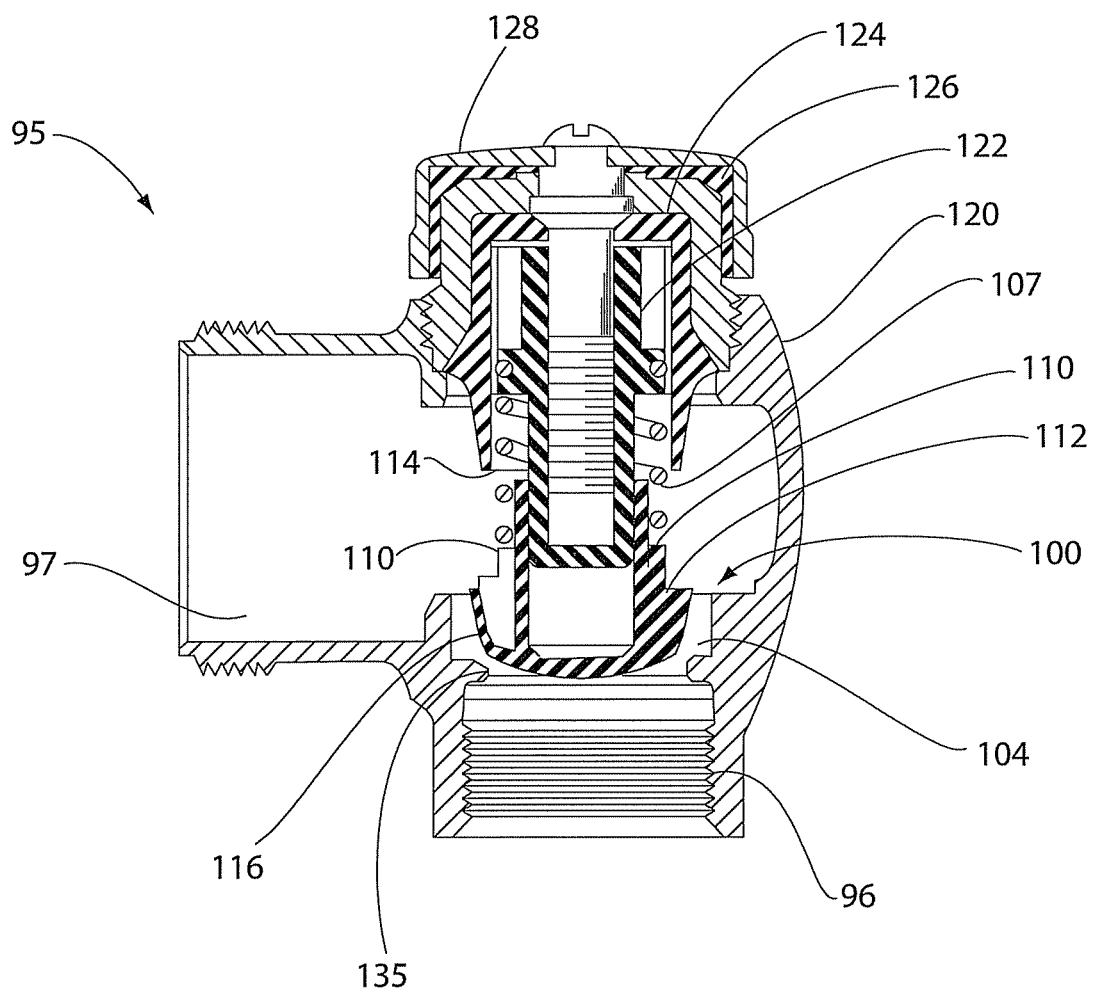
FIG. 8 is a side elevational view of an exemplary embodiment flush valve check valve utilizing the seal piston of FIGS. 6A and 7.

FIGS. 6A, 6B and 7 depict a piston/seal combination, generally illustrated as 100 for use with a flush valve check valve assembly, such as exemplary flush valve check valve assembly, generally indicated as 95, depicted in FIG. 8. The check valve 95 includes a valve body defining an inlet connection 96 which can be threadably engaged with a water supply, and an outlet connection 97, which can be threadably engaged with an inlet connection 12' of a flush valve assembly 10'. The piston/seal 100 includes a plurality of ribs 102 having a tapered design extending outwardly from the circumferential periphery of the piston/seal 100. Preferably, the piston/seal 100 is a unitary molded polymeric piece. A plurality of passageways 103 are defined between adjacent ribs 102 and a cylindrical side wall portion 105 of the piston/seal 100. The passageways 103 and tapered ribs 102 facilitate the flow of water past the piston/seal 100. The tapered ribs 102 allow the piston/seal 100 to center itself upon sealing an opening 104 within the flush valve check valve assembly 95. The tapered ribs 102 allow the water to more easily flow past the sealing surface of the piston/seal 100 improving performance. Generally, water is able to push the piston/seal 100 in one direction, whereas a spring 107 pushes or biases the piston/seal 100 in an opposite reaction to cooperate with valve seat 135 to seal the opening 104. Also, spring supports 110 are provided on the piston/seal 100 to support one end of the spring 107. Also, a stopping surface 112 is defined on the underside of the piston/seal 100 and may contact surface 114 in the open position. Once enough water pressure has built-up against the piston/seal 100, the counter forces exerted by the spring 107 are insufficient to maintain the seal against the opening 104. Therefore, water begins to flow over and past the piston/seal 100 towards the flush valve 10. In relation to the non-ribbed piston/seals, the tapered ribs 102 assist the water to more easily flow past the piston/seal 100 by allowing the water to flow between the tapered ribs 102 thereof.

The check valve assembly 95 also includes a stop body 120, piston guide 122, a guide holder 124, a stop cap 126 and cover 128.

The piston/seal 100 also includes an overmolded thermoplastic elastomer (TPE) or other suitable resilient sealing material 116 on the top surface of the piston/seal and, more specifically, along a periphery thereof. One example of a suitable sealing material 116 comprises a silicone rubber coating. The overmolded feature provides a one-piece design that resists tearing, shearing or chloramine degradation that may allow loose seal pieces to go into the valve and stall a flush. The material 116 serves as a seal with valve seat 135 within the flush valve check valve assembly 95 when the piston/seal 100 is in a closed position.

FIGS. 9A-12 show a piston seal 100' which is similar to the piston 100 except for the below noted differences. Like reference numerals are used for like parts.

Figure 9A:
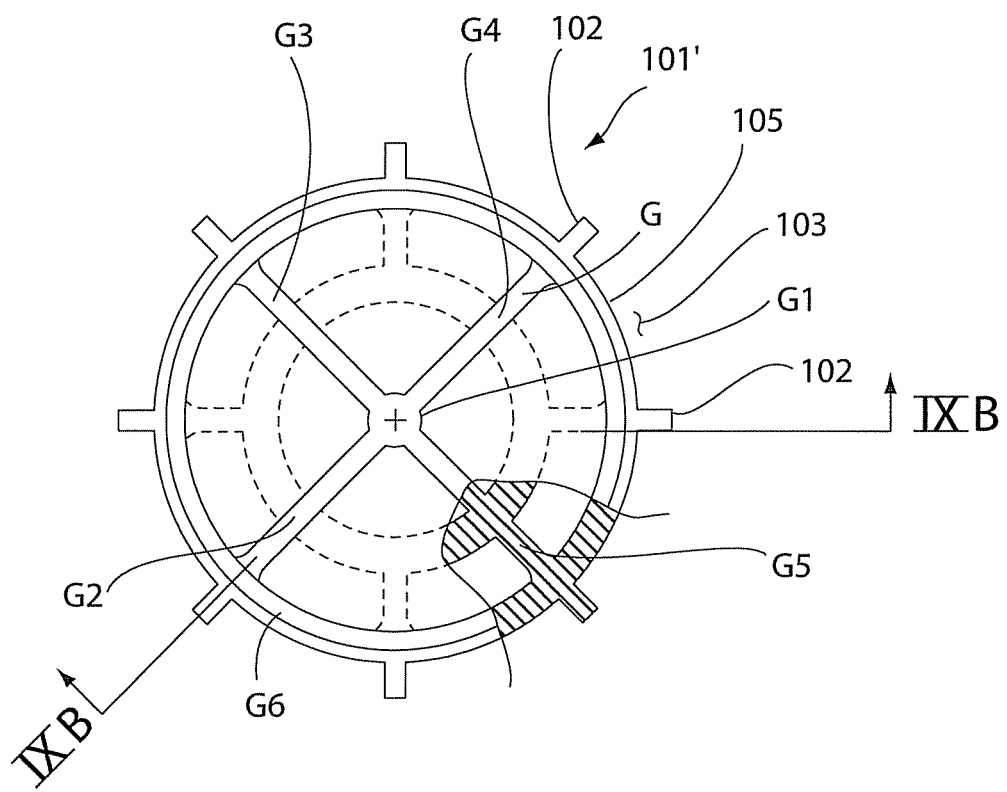
FIG. 9A is a top plan view of another piston without a molded seal made in accordance with the present invention.
Figure 9B:
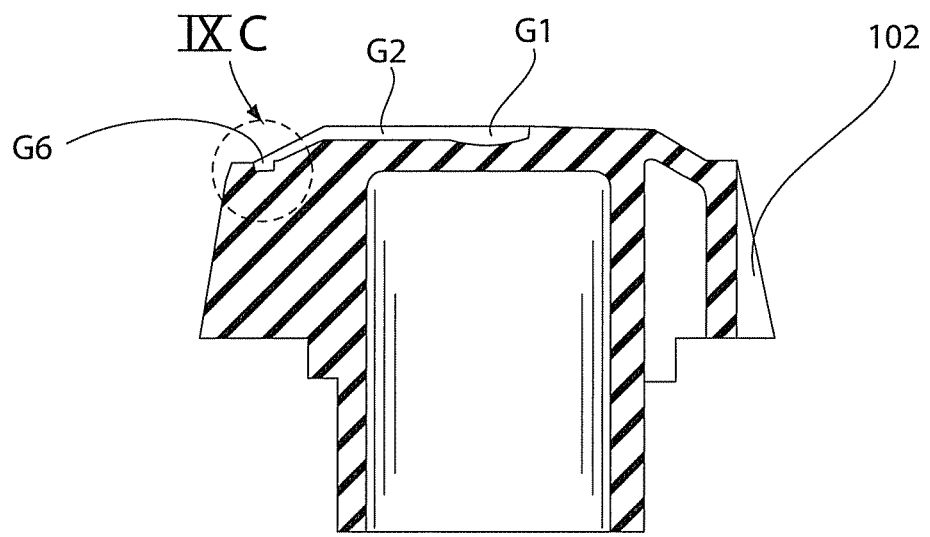
FIG. 9B is a section taken along line IX B-IX B of FIG. 9A.
Figure 9C:
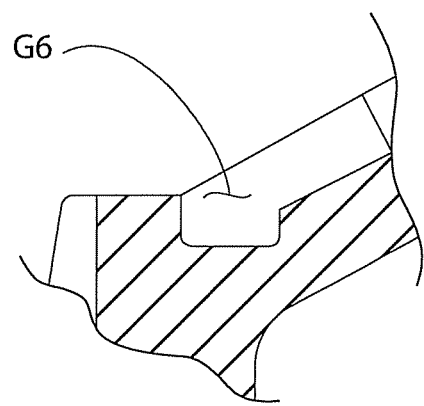
FIG. 9C is an enlarged section of area IX C shown in FIG. 9B.
Figure 10A:
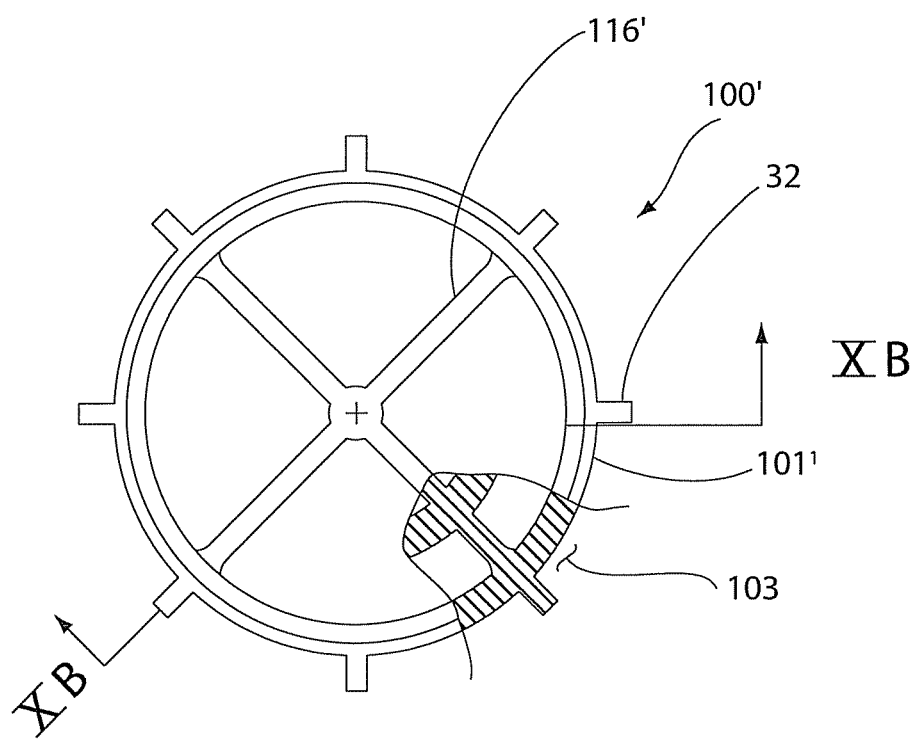
FIG. 10A is a top plan view of a piston with a molded seal, where the piston is that shown in FIGS. 9A-9C.
Figure 10B:
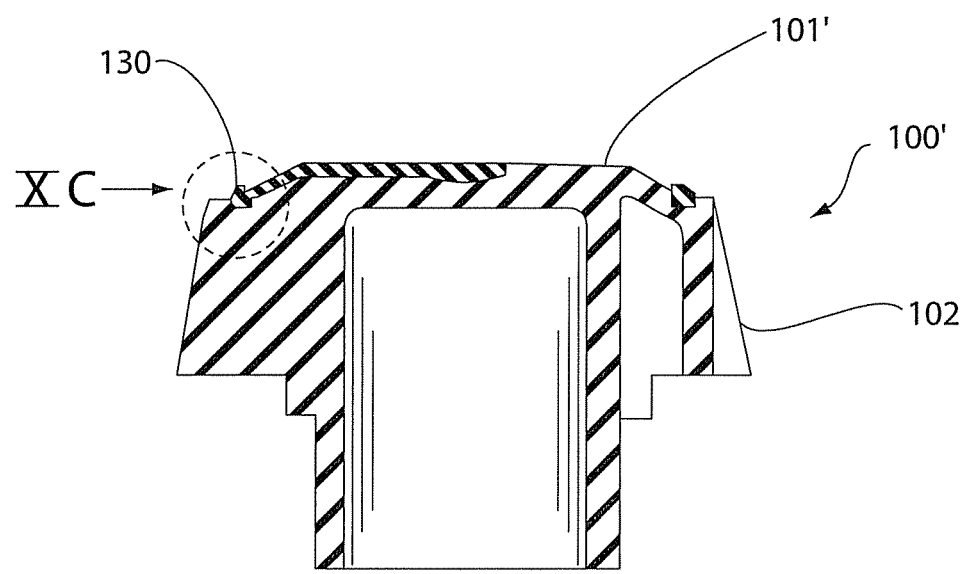
FIG. 10B is a section taken along line X B-X B of FIG. 10A.
Figure 10C:
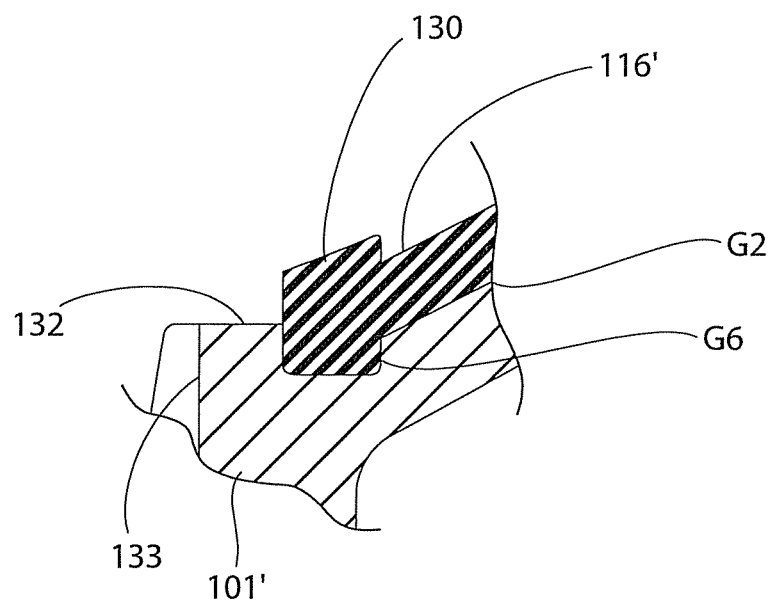
FIG. 10C is an enlarged section of area X C of FIG. 10B.
Figure 11:
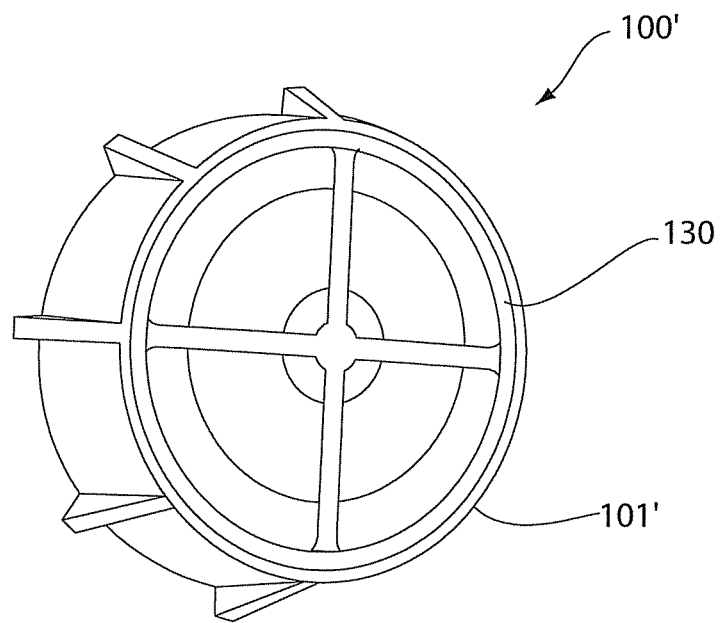
FIG. 11 is a top perspective view of the piston having the molded seal shown in FIGS. 10A-10C.

The piston seal 100' referring to FIGS. 9A-9C includes a piston body 101'. Preferably the body is made of glass-filled polypropylene. A gate passageway G is defined on the top of the piston body 101'. The passageway G includes a center portion G1 with a plurality of outwardly extending spokes, for example, four spokes G2, G3, G4 and G5, each leading to a circular recess G6 adjacent to the circumferential edge 133 of a top surface 132 of the piston body.

Referring to FIGS. 10A-12, the piston seal 100' has an overmolded seal 116' made of a silicone material (TPE) or other suitable resilient sealing material on the top surface of the piston/seal 100'. The overmolded seal 116' is received in passageway G and the seal 116' received in recess G6 defines an annular seal 130 that has trapezoidal cross sections and extends above the top surface 132 of the piston body 101'.

The present invention has been described with reference to the preferred embodiments. Modifications, combinations and alterations will occur to others upon reading the preceding detailed description. It is intended that the invention be construed as including all such modifications, combinations and alterations.

The invention claimed is:

1. A piston/seal for use with a flush valve check valve assembly, wherein the piston/seal includes a plurality of ribs having a tapered design extending outwardly from a circumferential periphery of the piston/seal,
    the piston/seal having a top surface comprising a gate passageway having a center portion, a plurality of outwardly extending spokes leading to a circular recess adjacent a circumferential edge of the top surface,
    wherein a sealing material is positioned within said gate passageway of said top surface including the circular recess to form an annular seal extending above a top surface of a piston body, said annular seal being adapted to seal with a seat of a stop within the check valve assembly at a location adjacent to a water source inlet.

2. A check valve, comprising:
    a valve body defining an inlet connection and an outlet connection, said inlet connection adapted for association with a water supply and said outlet connection adapted for association with a flush valve;
    a piston/seal positioned within said valve body, said piston/seal having a top surface adapted for biasing against a valve seat of said inlet connection, said piston/seal including a plurality of ribs having a tapered design extending from said top surface in an outwardly direction from a circumferential periphery thereof to a stopping surface of said piston/seal, wherein said plurality of ribs are tapered from the circumferential periphery to the stopping surface of said piston/seal, and wherein said top surface includes a sealing material positioned thereon, the top surface comprising a gate passageway having a center portion, a plurality of outwardly extending spokes leading to a circular recess adjacent the circumferential edge of the top surface, and wherein a sealing material is positioned within said gate passageway of said top surface including the circular recess to form an annular seal extending above a top surface of a piston body, said annular seal being adapted to seal with a seat of a stop within the check valve assembly at a location adjacent to a water source inlet.

* * * * *